United States Patent [19]
Deare

[11] 4,391,343
[45] Jul. 5, 1983

[54] RETRACTABLE TRACTED CART

[76] Inventor: Frederick A. Deare, 5 Kitchener Ave., Parry Sound, Ontario, Canada, P2A 1R7

[21] Appl. No.: 201,035

[22] Filed: Oct. 27, 1980

[30] Foreign Application Priority Data

Nov. 29, 1979 [CA] Canada .................................. 340896

[51] Int. Cl.³ ...................... B62D 55/08; B62D 55/26
[52] U.S. Cl. .................................... 180/198; 180/9.28
[58] Field of Search .................... 180/198, 9.26, 9.28, 180/9.3

[56] References Cited

U.S. PATENT DOCUMENTS

| | | | |
|---|---|---|---|
| 1,117,139 | 11/1914 | Olmstead et al. | 280/9 |
| 1,238,762 | 9/1917 | Hapeman | 280/9 |
| 1,534,639 | 4/1925 | Engleman et al. | 180/9.28 |
| 1,566,085 | 12/1925 | Geaudreau | 280/9 |
| 1,701,212 | 2/1929 | Nickerson | 280/9 |
| 1,729,374 | 9/1929 | Ehrhart | 180/9.28 |
| 2,105,042 | 1/1938 | Kegresse | 180/9.28 |
| 2,173,794 | 9/1939 | Von Radiis et al. | 180/9.3 |
| 2,282,745 | 5/1942 | Preston | 305/20 X |
| 2,556,270 | 6/1951 | Groeller | 305/20 X |
| 2,683,608 | 7/1954 | Matheson | 280/9 |
| 2,782,076 | 2/1957 | Miller | 309/20 X |
| 3,417,832 | 12/1968 | Ziccardi | 180/9.3 |
| 3,926,272 | 12/1975 | Weber | 180/198 |

FOREIGN PATENT DOCUMENTS

2436038  5/1980  France ................................ 180/198

*Primary Examiner*—Joseph Paul Brust
*Attorney, Agent, or Firm*—Colton & Stone, Inc.

[57] ABSTRACT

A convertible traction device for permitting a road vehicle to be used in an off-road configuration is described. The device is provided as a trailer having a pair of retractable road wheels with a pair of traction belt assemblies mounted thereon. The traction belt assemblies each include an endless belt, a plurality of support wheels about which the belt is entrained and a supporting framework, each assembly being pivotally attached to the trailer chassis. During towing the road wheels support the trailer on the ground with the traction belt assemblies being held in a retracted position above the trailer platform. For off-road use the traction belt assemblies are pivoted downwardly until the belts engage the ground, the assemblies are locked in position and the road wheels are retracted. The vehicle is driven onto the platform so that the drive wheels thereof engage drive rollers mounted in the trailer chassis, which rollers, as the vehicle's drive wheels rotate, impart driving movement to the traction belt. Operator controlled brakes on the drive rollers are used to stop the device and to turn the device to the left or the right.

12 Claims, 14 Drawing Figures

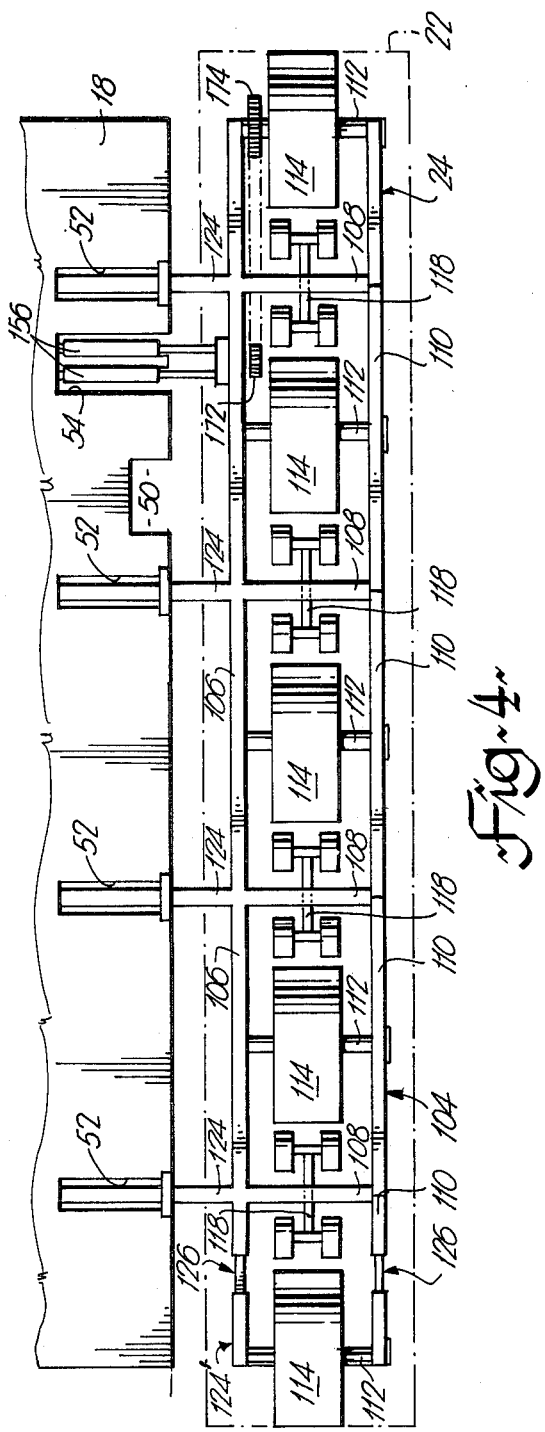
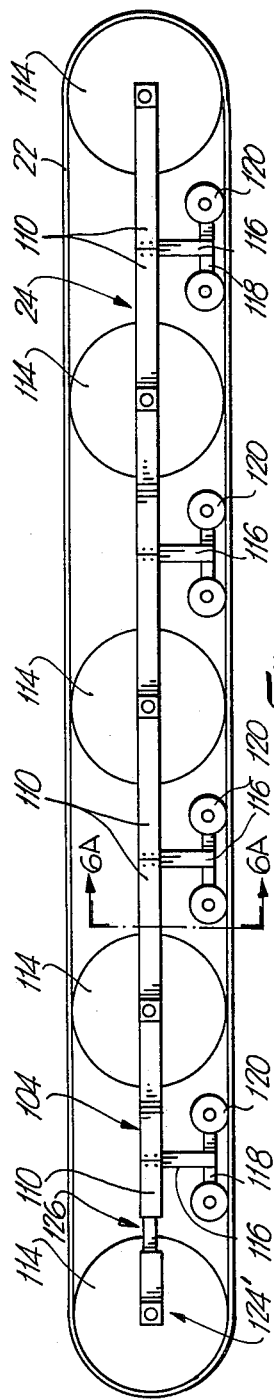

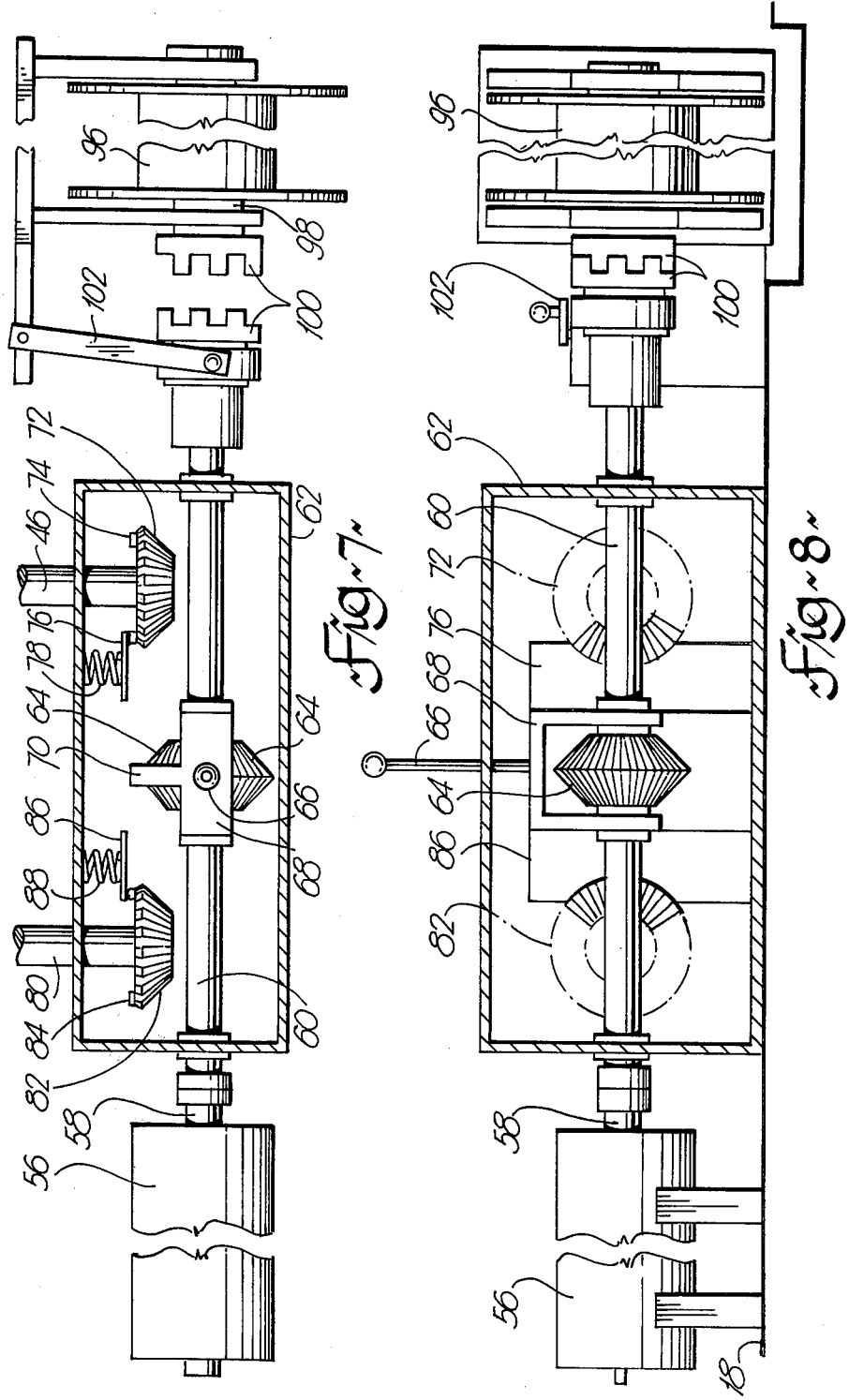

RETRACTABLE TRACTED CART

The present invention relates to traction devices for converting a road vehicle to off-road use.

BACKGROUND OF THE INVENTION

There has recently been a proliferation of recreational vehicles (RV's) on the market, including camping trucks, motor homes, private vans, sport trucks, et cetera each appealing to a particular segment of the public. Such vehicles are used as RV's primarily during the summer months and most of them are restricted to normal road use. Even those vehicles which are capable of off-road use are used primarily as such during the summer months as they are not capable of traversing deep snow. Certain vehicles, typically snowmobiles, are designed strictly for use in snow but they, in turn, are less than effective as normal road vehicles.

In the past there have been many attempts to convert road vehicles to off-road use, most such attempts involving the provision of endless tracks which can be attached to and driven by the vehicle drive wheels. Such attempts are typified by U.S. Pat. Nos. 2,683,608 (Matheson, July 13, 1954); 1,566,085 (Geaudreau, Dec. 15, 1925); 1,238,762 (Hapeman, Sept. 4, 1917); 1,117,139 (Olmstead et al, Nov. 10, 1914); 2,782,076 (Miller, Feb. 19, 1957); 2,556,270 (Groeller, June 12, 1951) and 1,701,212 (Nickerson, Feb. 5,1929). Another interesting attempt at converting a vehicle to off-road use, in fact to marine use, is found in U.S. Pat. No. 2,282,745 (Preston, May 12, 1942). In the Preston patent a floating trailer having retractable road wheels has traction belt means engageable by the vehicle's drive wheels for, in turn, driving a pair of propellors to achieve propulsion when in the water. The vehicle is supported by the trailer platform when the device is in its marine configuration.

All prior art devices as typified by the above-identified U.S. patents have the shortcoming that extensive mechanical changes must be effected before the vehicle is suitable for off-road use and that the loading per square foot of track is so great that performance on snow or other unconsolidated surfaces, such as tundra, is impeded. The Preston device of course is only usable in a marine environment and as such cannot be used on snow or tundra.

There is therefore a need for a device which is simple to operate and economical to produce which can readily transform a road vehicle to an off-road vehicle to extend the effectiveness of the vehicle during winter months and in areas where the vehicle would be otherwise useless.

SUMMARY OF THE INVENTION

The present invention overcomes the shortcomings of the prior art by providing a trailer which may be towed behind a host vehicle and which carries traction means drivable by the vehicle when converted to an off-road mode. The traction means are in the form of a traction belt entrained about belt support wheels mounted in a framework. The traction means, in the road configuration are located in a position above the trailer platform and for conversion to the off-road mode the traction means are pivoted outwardly and downwardly until the tracks engage the ground, in which position they are locked in place. The road wheels may then be retracted, leaving the platform supported solely by the traction means. The vehicle may then be driven onto the platform and positioned thereon so that the drive wheels engage drive means located in the platform which drive means are connected to the traction means to drive the traction belt. Steering is by differential electric braking on the drive means to each belt with control being by a simple bi-directional, spring-loaded switch located in the vehicle's passenger compartment and connected to the vehicle's electrical system.

The present invention may be constructed in various sizes to accommodate different types of vehicles, from small front-wheel drive imports, through larger four-wheel drive trucks, to even large vans and motor homes. With the last type of vehicle the owner in essence has a winter cottage which he can take to his favourite summer vacation spot in the winter. It is contemplated for example that with a gross weight of 9,000 pounds (vehicle plus trailer) and an appropriate belt, the loading on the snow would be in the neighbourhood of 60 pounds per square foot, very reasonable when compared to that of a snowmobile or even a man on snowshoes.

In summary, therefore, the present invention may be broadly defined as a convertible traction device for use with a vehicle having at least two drive wheels, comprising: a trailer for towing behind the vehicle and having a platform sized to receive the vehicle, hitch means and a road wheel assembly; first means for selectively moving the road wheels between an operative ground engaging position and a retracted position, relative to the platform; traction means for each side of the trailer and including a traction belt and belt supporting means; second means for selectively moving the traction means between a retracted position and an operative ground engaging position relative to the platform; means for locking the traction means and the road wheels in their respective operative and retracted positions; and drive means in the platform, engageable by the vehicle drive wheels, for driving the traction means when the vehicle is on the platform and the traction means are in their operative position.

BRIEF DESCRIPTION OF THE DRAWINGS

FIG. 4 is a plan view of the traction belt assembly.

FIG. 5 is an elevation of the traction belt assembly.

FIG. 6A is a section taken along the line 6A—6A of FIG. 5 and appears on the same sheet as FIG. 2.

FIG. 7 is a plan view, partly in section, of the power distribution unit for use in selectively raising and lowering the road wheels and the traction belt assembly.

FIG. 8 is an elevation, partly in section, of the power distribution unit.

DESCRIPTION OF THE PREFERRED EMBODIMENT

Figure 1:
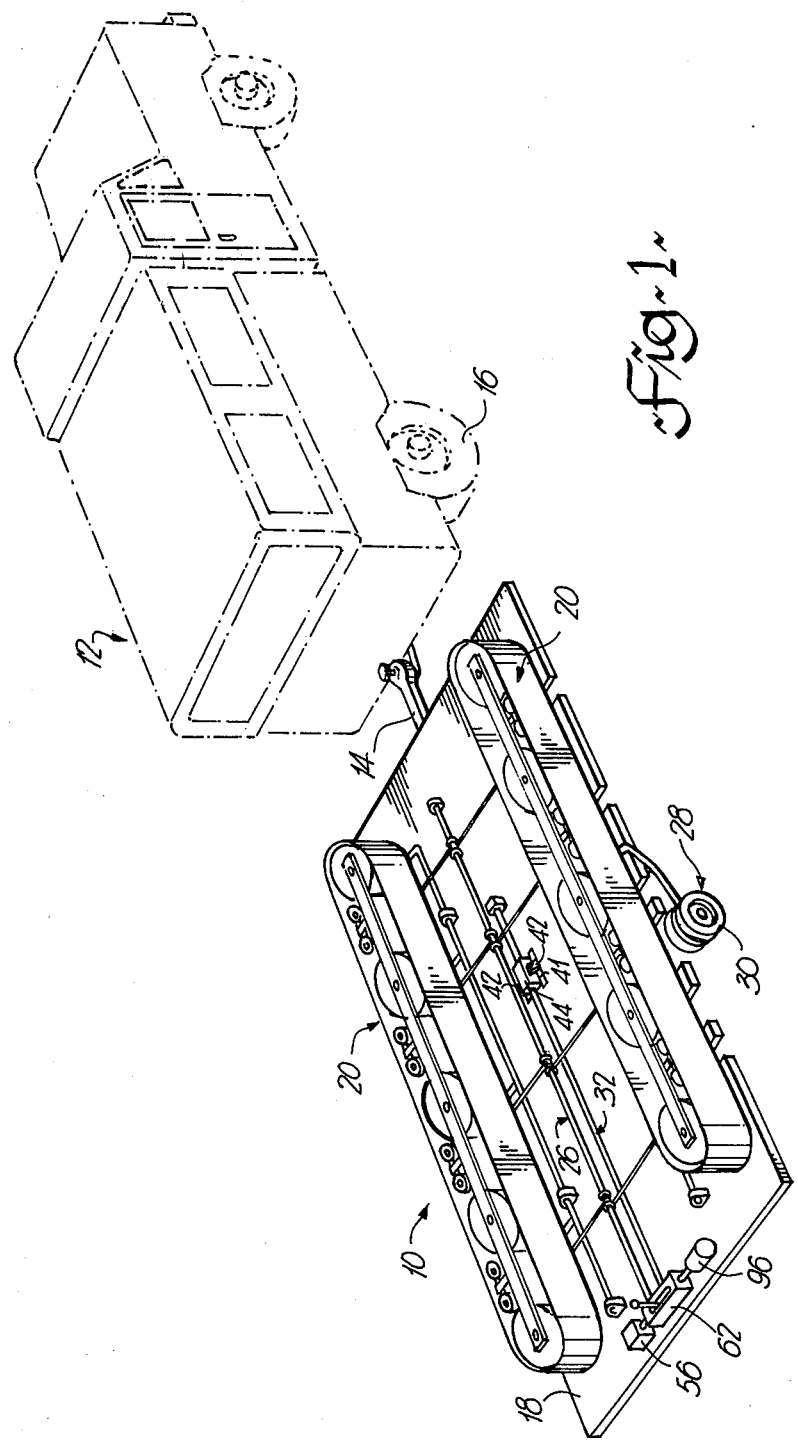
FIG. 1 is a perspective view of the traction device of the present invention shown in its trailer configuration.

FIG. 1 illustrates the convertible traction device 10 of the present invention in its towing mode as it is towed behind a vehicle 12 via hitch 14. In the embodiment as illustrated and described herein, the vehicle is presumed to be a two-wheel drive vehicle with a pair of drive wheels 16, although it is understood that it would be possible to provide a traction device operable for 4-wheel drive vehicle as well.

Figure 2:
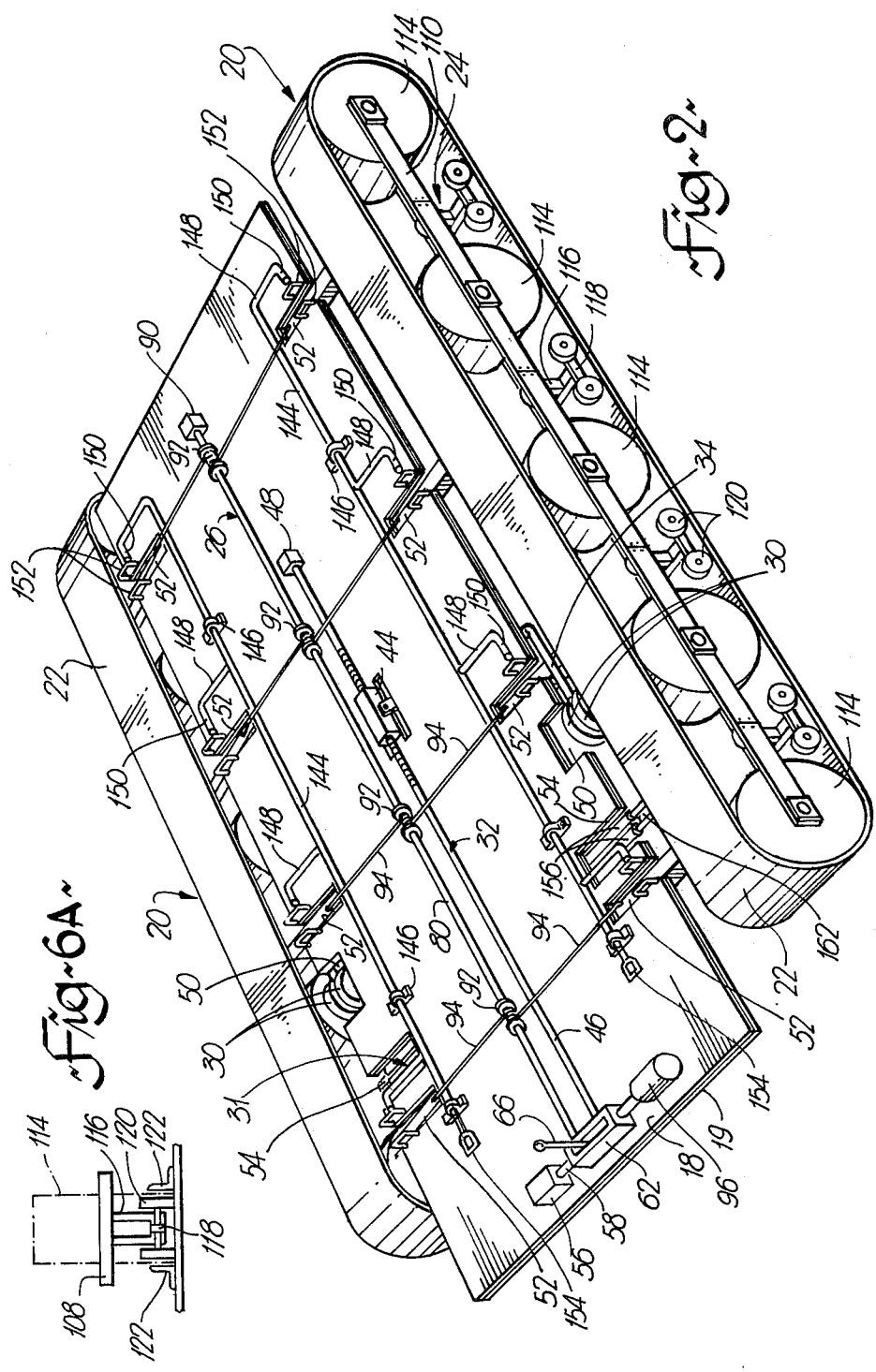
FIG. 2 is a perspective view of the traction device in its off-road mode.

The basic components of the present invention are illustrated generally in FIGS. 1 and 2 and more specifically in subsequent Figures. Thus, as seen above, the device 10 has a hitch 14 for use in towing the device as a trailer. The hitch 14 may be retractable below the main platform 18 of the device for storage when towing is not required. Retraction of the hitch may be accomplished in any conventional manner.

The platform 18 is sized to receive a vehicle, usually the tow vehicle, thereon. The platform 18 is mounted on a perimeter-type chassis 19 constructed from truck frame stock and welded together to achieve the desired configuration. It is understood that the chassis will be sufficiently braced so as to withstand the weight of the vehicle and its load as well as the dynamic stresses to be encountered in use.

Pivotally attached to the chassis are traction means 20, there being one for each long side of the device. Each traction means, to be described in greater detail hereinafter, constitutes a traction belt 22 and a belt support means 24. The traction means 20 can be moved between a retracted position as shown in FIG. 1 and an operative ground engaging position as shown in FIG. 2. In the retracted position of FIG. 1 the traction means are positioned above the platform 18.

Means, such as the windlass mechanism 26, are provided to selectively move the traction means 20 between their retracted and operative positions. These means will also be described in greater detail hereinafter.

A road wheel assembly 28 is also provided to support the device in its towing mode or whenever the traction means are retracted. The road wheel assembly includes the road wheels 30 and means 32 for selectively moving the road wheels between an operative ground engaging position and a retracted position relative to the platform 18.

Drive means 31, in the form of a plurality of rollers, is engageable with the vehicle drive wheels and in turn drives the traction belt 22.

Locking means, to be described individually hereinafter, are provided for locking the road wheels 30 and the traction means 20 in their respective retracted and operative positions.

Referring now to FIGS. 3 through 12B the various components used in the structure of the convertible traction device of the present invention will be described in greater detail.

Figure 3:
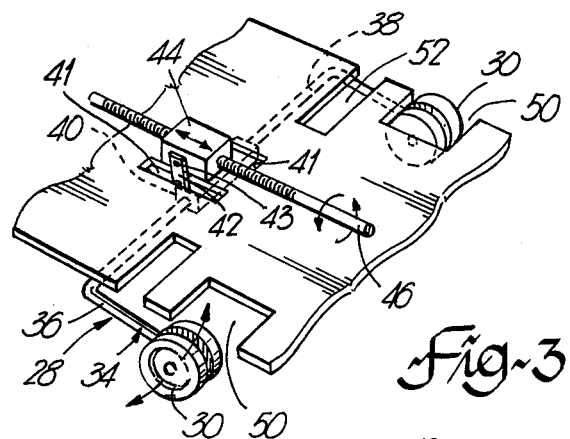
FIG. 3 is a partial perspective view of the road wheel assembly and appears on the same sheet as FIG. 11.

FIG. 3 shows the details of the road wheel assembly per se. The road wheels 30, shown as a tandem set for each side of the device, are rotatably mounted in a conventional manner on a suspension member 34 comprising a trailing arm 36 and a torsion bar 38. The torsion bar is pivotally mounted to the underside of the chassis 19 supporting the platform 18, and is anchored in an anchor box 40. The torsion bar is mounted on suitable journals, not shown, affixed to the underside of the chassis, in a conventional manner. This torsion bar system thus provides a suitable suspension for the trailer when it is towed behind the vehicle 12.

Above the anchor box 40 is a pair of transversely spaced longitudinally directed slots 41 located in the chassis 19 and the platform 18. Affixed to the anchor box and projecting upwardly through each slot is a pivot arm 42. Above the platform 18 and intermediate the upper ends of the pivot arms 42 is a nut member 44 provided with a longitudinally extending threaded bore therein and pivotally connected to each pivot arm as at 43. A threaded rod 46, forming a part of the means 32 for moving the road wheels between their retracted and operative positions, is threaded through the threaded bore of the nut member 44 and is bearingly supported at its free end in a bearing block 48 affixed to the platform 18.

Rotation of the rod 46, initiated in a manner to be described hereinafter, will cause longitudinal movement of the nut member 44 and hence a pivoting action in the suspension system, as depicted by the arrows in FIG. 3. Rod 46 is designed so as to have a degree of flexibility so as to accommodate the vertical component of movement of the nut member 44 during its longitudinal passage along the rod. When the road wheels 30 are fully retracted they will be located in the opposed wells or notched portions 50 provided in the platform 18 and the chassis 19.

The platform 18 and the components mounted thereon are best seen in FIG. 2. As mentioned above the platform has opposed wells 50 which accept the road wheels when they are retracted. The sides of the platform are provided with additional opposed wells 52, longitudinally spaced apart, which receive the pivot arms for the traction means as will be described hereinafter. Between the rearmost wells 52 and the wheel wells 50 are the opposed wells 54 which will receive the drive means.

At the rear of the platform 18 is mounted a motor 56 which can be battery powered, or driven by the electrical system of the vehicle in a conventional manner. The motor shaft 58 is coupled to a selector shaft 60 which passes through a selector box 62 as is shown in greater detail in FIGS. 7 and 8. Shaft 60 is splined and carries a double-faced bevel gear 64 which is slidable along shaft 60 under the control of a selector lever 66 connected to a yoke 68 journaled to the bevel gear 64. Projecting forwardly from the yoke 68 is an arm 70, the purpose of which will become apparent.

Selector box 62 bearingly receives the other end of the threaded rod 46, which end is provided, within box 62, with a single-faced bevel gear 72 which in turn is engageable with the adjacent face of the bevel gear 64. The backside of gear 72 carries a plurality of teeth 74 which are engageable by cooperating teeth on a plate 76, plate 76 being connected to the front wall of the box 62 by way of a compression spring 78. When the teeth on the plate 76 engage the teeth 74 on the bevel gear 72 the gear and hence the rod 46 is locked against rotation. This locking mechanism, when combined with the mating thread formation between the rod 46 and the nut member 44 is sufficient to lock the road wheel assembly in its selected position, whether retracted or operative or in between.

A second rotatable rod 80, part of the windlass mechanism 26, is bearingly supported at one end in selector box 62 and carries a single-faced bevel gear 82 therein. This gear is provided with teeth 84, engageable with teeth on a locking plate 86 mounted to the front wall of the box 62 by way of the compression spring 88. The operation of this assembly from the locking standpoint is analogous to that already described with respect to rod 46.

Returning to FIG. 2 the rod 80 is seen to extend forwardly just above the platform 18 parallel to rod 46. Rod 80 is bearingly supported at its forward end in a bearing block 90 and while this is believed to provide sufficient support for rod 80 it is clear that additional bearing means, such as pillow blocks, (not shown) could be provided along the length of rod 80.

At positions aligned with the wells 52 rod 80 carries windlass members 92 which in turn will carry cables 94 (see FIG. 2). The cables are arranged so that rotation of rod 80 in one direction will result in all cables being wound onto the windlass members 92 and so that rotation in the opposite direction will result in the unwinding of all cables 94.

FIGS. 7 and 8 show as well an optional feature of the present invention, namely the winch 96. The winch has its shaft 98 aligned with the selector shaft 60 and the shaft ends are provided with the mating portions 100 of a dog clutch. The portion 100 mounted on shaft 60 is slidable thereon, controlled by the arm 102, so as to engage the portion 100 on the shaft 98 when it is desired to use the winch. Since the motor 56 is reversible, the winch 96 will also be reversible.

The traction means will be described with reference to FIGS. 4 and 6. As previously indicated, the traction means includes a traction belt 22 (shown in dotted lines in FIG. 4) and the belt supporting means 24. The belt supporting means includes a framework 104 made up of an inside longitudinal rail 106, a plurality of cross brace members 108 and a plurality of outside rail members 110. Each rail member 110 is removably connected to the brace members 108 for individual removal so as to gain ready access to the components mounted within the framework 104. Mounted within the framework 104 parallel to the cross braces 108 are the axle members 112. Each axle member 112 bearingly carries a belt support wheel 114, which, in the present embodiment may be a standard automotive-type wheel with a pneumatic tire mounted thereon.

Extending downwardly from each cross-brace 108 is a U-shaped mounting post 116 to which is pivotally mounted a bogie support frame 118. Bogie wheels 120 are in turn rotatably mounted to the frame 118 and they are positioned so as to exert a slight downwards (as in FIG. 5) pressure on the belt 22. The bogie support frame 118 may be mounted to the respective cross-brace 108 by suitable spring means so as to compensate for irregularities in the terrain over which the device is to travel.

As seen in FIG. 6A the belt 22 is provided on its inside surface with transversely and longitudinally spaced rail members 122, connected to the belt in any conventional and appropriate manner. The rails will accommodate the belt support wheels 114 and the bogie wheels 120 therebetween, to thereby center the belt on the wheels 114, 120 and to ensure proper tracking of the belt.

Extending outwardly of the framework 104 from the inside rail 106 is a plurality of pivot arms 124. The pivot arms are spaced apart longitudinally so that they are receivable in the wells 52 in the platform 18 and chassis 19. Although not essential, it is suggested that, as shown in FIG. 4, the pivot arms 124 should be aligned with the cross-braces 108. The free end of each arm 124 is provided with means for pivotally connecting the arm to the chassis, the pivotal connections for all arms on each side of the chassis being aligned. The pivotal connection may be effected in any desirable manner, as by a pivot shaft mounted in the chassis 19 and passing through a suitable aperture in the pivot arm 124. Since the exact type of pivot joint to be used is a matter of design rather than invention a specific joint has not been illustrated in the drawings, it being understood that anyone constructing the present invention could provide a suitable pivot joint.

Belt 22 may be formed in any suitable manner from any suitable material, such as rubber. It could also be formed as a plurality of plates hinged to each other so that the belt will move appropriately about the end support wheels. To aid in belt removal and to tension the belt as desired the forward portion 124' of the framework 104 is longitudinally adjustable ralative to the remainder of the framework, the details being shown in FIG. 6B. The adjusting means 126 is illustrated with respect to the frame member 110 but the same construction is used for the frame member 106.

Figure 6B:
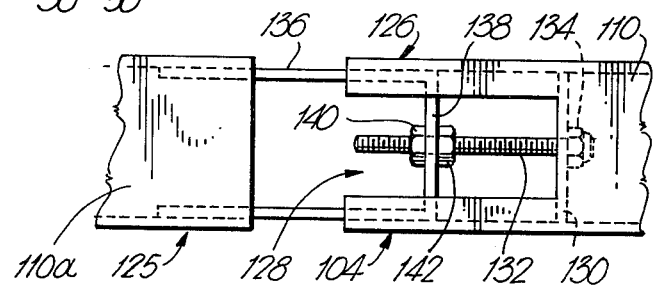
FIG. 6B is an enlarged view of the track tension adjusting mechanism and appears on the same sheet as FIG. 11.
Figure 11:
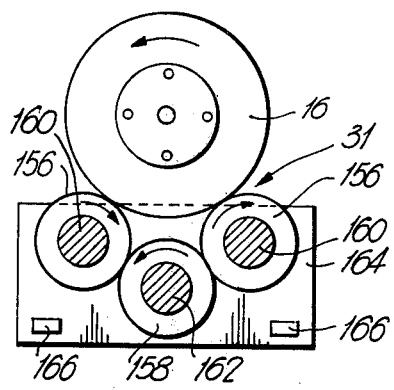
FIG. 11 is a section taken along the line 11—11 of FIG. 10.

In FIG. 6B the frame member 110 is shown as having a C-shaped or channel cross-section. A portion of the web is cut away as at 128 and a plate 130 is welded to the interior of the member. Plate 130 has a central hole therethrough so as to receive a bolt 132, the head 134 of which is welded to the back surface of the plate 130. The frame member 110a forming a part of the forward portion 125 is also of channel shape and has a U-shaped yoke 136 welded therein and projecting therefrom for reception within frame member 110. The end plate 138 of yoke 136 has a central bore for reception of the threaded shank of bolt 132. Two adjusting nuts 140, 142 are provided for threaded reception on the bolt 132, the nuts being positioned one on each side of the end plate 138. Access to the nuts 140, 142 is achieved through the cut out 128 in the web of frame member 110. By loosening nut 140 and tightening nut 142 the frame member 110a is moved away from frame member 110 with the effect that the belt 22 entrained about the support wheels 114 is tensioned. By loosening nut 142 and tightening nut 140 frame member 110a approaches frame member 110 and the belt is loosened. Once loosened the belt may be removed from the support wheels 114 if desired.

Referring to FIG. 2, the means for locking the traction means in its ground engaging or operative position will now be described. Positioned on platform 18, parallel to the sides thereof and adjacent the closed ends of the wells 52 are the locking bars 144. They are movable reciprocally on the platform 18 longitudinally thereof through guides 146. A plurality of L-shaped locking arms 148, one for each well 52 along the corresponding side of the platform 18 is affixed to each bar 144, the foot 150 of each arm 148 being sized and adapted to overly its corresponding well 52 when the locking bar is moved from its rest position of FIG. 2 to its active, locking position. On each side of each well 52 is a guide or arch 152 having an opening therein for receiving the foot 150 of the adjacent locking arm 148. A D-shaped ring 154 is connected to the rearmost end of each locking bar 144 for use in moving the bar 144 longitudinally of the platform 18. Means, not shown, may be provided on the platform 18 for engaging the ring 154 at either or both of its terminal positions to prevent inadvertent movement thereof.

As is clear from FIG. 2, when the traction means are in their operative positions and the foot of each locking arm is held by the arches 152 over its well 52, the pivot arms 124 are prevented from moving upwardly in the wells 52 and hence the traction means is locked into its operative, or ground position. Release of the locking means will of course permit the pivotal action of the pivot arms 124.

Figure 9:
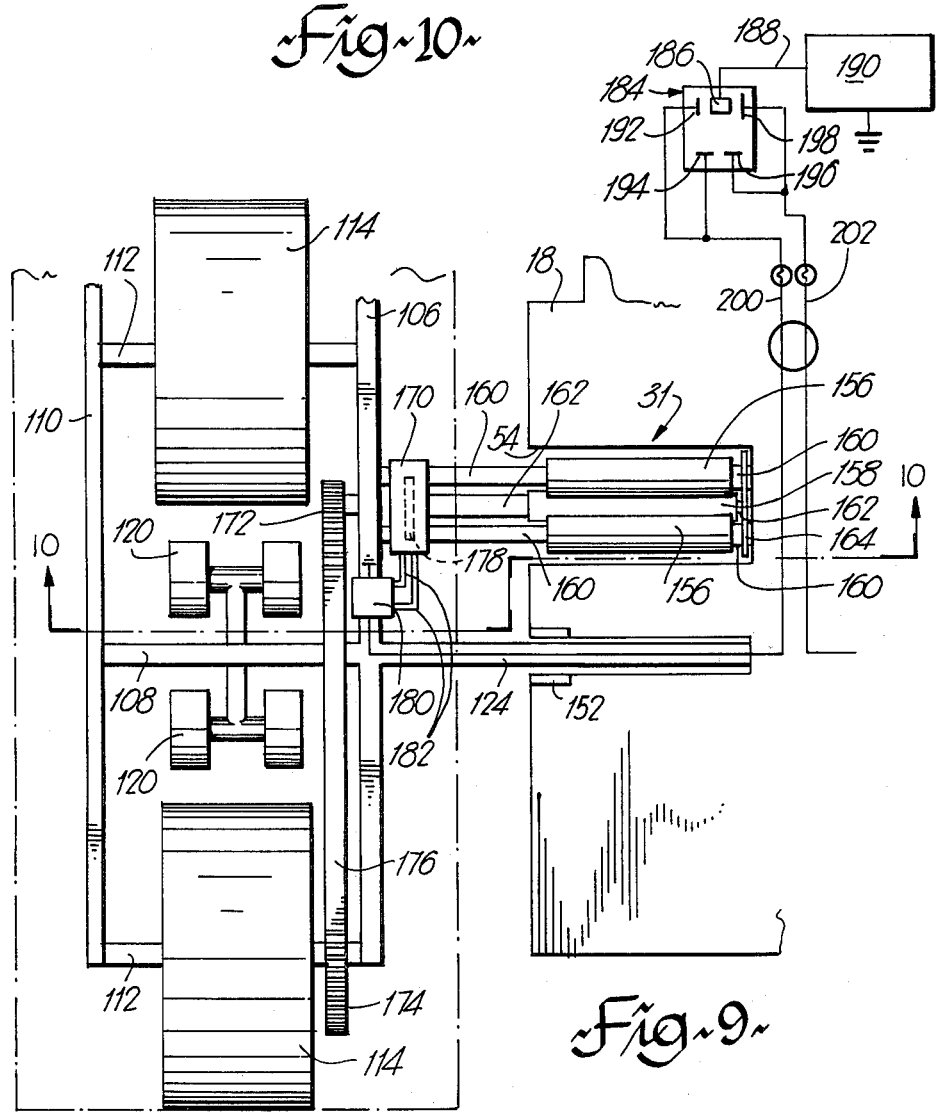
FIG. 9 is a plan view of the drive means of the present invention.

The drive means 31 is shown in greater detail in FIGS. 4, 9, 10 and 11. As seen in FIGS. 4 and 9, the drive means for each side of the platform is mounted in the respective well 54 and includes a pair of drive rollers 156 which project slightly above the upper surface of the platform 18 and an idler roller 158 which is always in driving contact with the two drive rollers 156. At the innermost end the shafts 160 mounting the drive rollers and the shaft 162 mounting the idler rolls are each bearingly mounted in a mounting plate 164. Pivot arms 166 project from the mounting plate 164 and may be provided with an eye 168 for receiving a pivot pin (not shown) which in turn is mounted in the chassis 19. With this arrangement the drive means is easily pivoted along with the traction device when required. At its opposite end the shaft 162 of the idler roller is bearingly supported as it passes through the inner rail 106 of the track support framework 104. The other end of each shaft 160 is bearingly supported in a brake housing 170 which may be appropriately affixed to the framework 104.

At the free end of the shaft 162, within the confines of the framework 104 is mounted a drive sprocket 172. A driven sprocket 174 is mounted to the shaft 112 carrying one of the track support wheels 114. A chain 176 is entrained about the sprockets 172, 174 to transfer drive from sprocket 172 to sprocket 176 and hence to the associated wheel 114 and the traction belt 22.

Shaft 162 also carries a brake disc 178, a portion of which is enclosed by the brake housing 170. The brake housing 170 carries brake pads and a caliper assembly in a conventional manner so as to apply braking forces to the disc 178. The movement of the brake pads is controlled by an electrically operated hydraulic actuator 180. Hydraulic fluid, under pressure, can pass to the brake housing, to operate the pads, by way of the lines 182.

To control the braking action of the vehicle, and hence the steering thereof when the traction means are in use, a selector "mode" control 184 is utilized. The mode control simply utilizies a joy-stick 186 connected via a lead 188 to the vehicle's electric system 190. Within the control box 184 are four terminals 192, 194, 196, 198 with terminals 192, 194 being each connected to the left hand brake actuator and with terminals 196, 198 being connected to the right hand brake actuator via leads 200, 202 respectively.

With joy-stick 186 positioned as shown in FIG. 9 the vehicle may proceed under power, with no restraints. If the joy-stick is moved into contact with terminals 194, 196 both brakes will be actuated and the traction device will come to a halt. Should the joy-stick be brought into contact with terminal 192 only, the left-hand brake only would be actuated. This would stop movement of the left-hand belt without stopping the right-hand belt and consequently the traction device would undergo a pivoting-type of turn to the left. A right-hand turn is achieved by contacting the joy-stick 186 with the remaining terminal 198. The mode control box 184 may have its upper surface gated so that there will be no confusion as to what path the joy-stick is to follow when the desired mode is to be selected.

The operation of the present invention will now be described with reference to the Figures previously discussed as well as with reference to FIGS. 12A and 12B. It will be assumed that the traction device 10 is initially in its towing mode as shown in FIG. 1, that is with the road wheels 30 in their operative, or ground engaging, position and with the traction means 20 in their retracted positions above the platform 18.

The first step in converting the device for off-road use involves unhitching the vehicle and then lowering the traction belts. The mode control 184 is hooked to the vehicle's electrical system to provide the vehicle's electrical power to operate the motor 56 and to permit the traction belt brakes to be locked. This will prevent any inadvertent movement of the trailer once the belts are in their ground engaging positions. With reference to FIG. 12B, the control arm 66 is moved to the left and forward so that arm 70 engages plate 86 and compresses spring 88 to disengage the teeth on the plate from the teeth 84 on gear 82. The forward movement of control arm 66 brings the gears 64 and 82 into mesh and the motor 56 is then operated to effect rotation of rod 80 through shafts 58 and 60 and gears 64 and 82. The rod 80 is rotated in a direction to unwind the cables 94 from each windlass 92 and, since the cables are connected to the pivot arms, the traction means frameworks 104 will pivot outwardly under the effect of gravity. Once the traction means have reached their operative position with the track 22 engaging the ground the motor is stopped and the locking bar 144 is slid rearwardly so as to lock the pivot arms 124 in their operative positions as hereinbefore described.

Figure 12A:
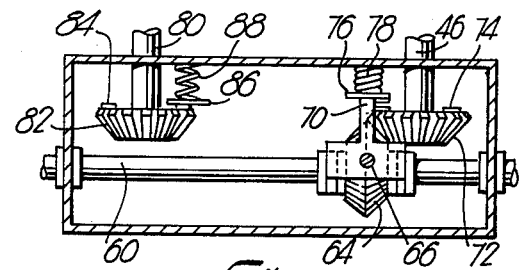
FIGS. 12A and 12B show the interior of the power distribution unit during raising and/or lowering of the road wheels and the traction belt assembly respectively.
Figure 12B:
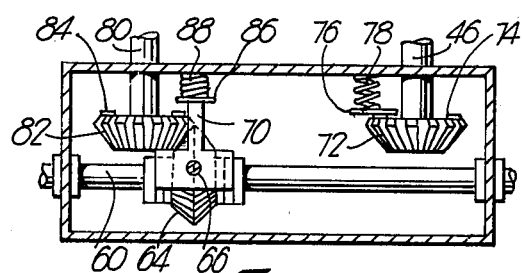
Figure 10:
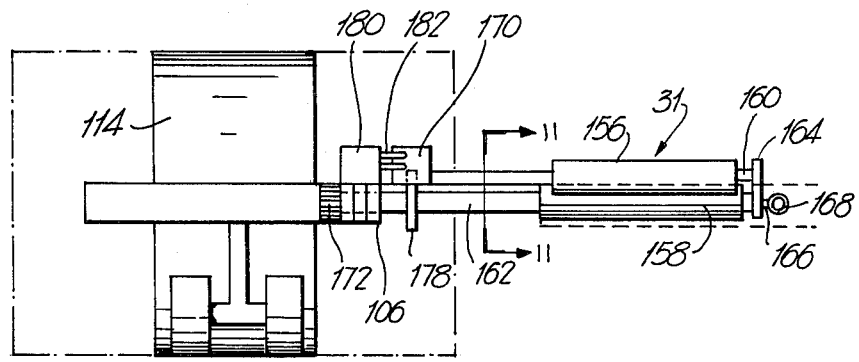
FIG. 10 is a section taken along the line 10—10 of FIG. 9.

The control arm 66 is then moved to the right as in FIG. 12A. Arm 70 engages plate 76 to disengage the teeth thereon from the teeth 74 on bevel gear 72 to release rod 46 for rotation. Bevel gear 64 engages gear 72 and the motor is operated to effect rotation of rod 46. The rotation of the threaded rod 46 causes longitudinal movement of the nut member 44 towards the front of the platform 18, resulting in pivoting motion of the road wheel assembly about the torion bar 38 until the road wheels have entered the respective wells 50. When the road wheels are fully retracted the bevel gear 64 is moved to its central location (FIGS. 7 and 8) under the influence of control arm 66 and the rods 80 and 46 are locked against rotation by the engagement of the teeth 84, 74 with the teeth on the respective spring biassed plates 86, 76.

The vehicle 12 is then driven onto the platform 18 by way of suitably sized ramps (not shown) which when not in use may be conveniently stowed on or under the platform 18. The vehicle is positioned on the platform with its drive wheels 16 engaging the drive rollers 156. Suitable tie-down means (not shown) may be used to secure the vehicle to the platform against movement relative thereto. When the vehicle is put into gear rotation of the drive wheels 16 will impart rotation to the drive rollers and hence to the idler rollers 158 which, in turn, rotate in the same direction as the drive wheels 16. Thus, the drive from the vehicle is transferred to the traction belt through the chain drive previously described. Directional and braking control is achieved by the disc brake assembly and the mode control selector 184, again as previously described.

When it is desired to return the traction device to its trailer configuration, the previously described steps are reversed. The vehicle is driven from the platform 18 by way of the ramps which are then returned to their stowage locations. Then the road wheels are lowered to their operative ground engaging positions by engaging the gears 64 and 72 as previously described and operating motor 56 in the opposite direction. Once the road wheels have been lowered, the rod 46 is locked against rotation by engagement between the teeth on plate 76 and the teeth 74 on gear 72. This engagement occurs after the control arm 66 has been moved to disengage the gears 72 and 62 and to disengage arm 70 from plate 76.

The next step involves the unlocking of the traction means and this is accomplished by sliding the locking bars 144 forwardly so as to displace the foot 150 of each locking arm 148 from its position above the respective pivot arm 124. The pivot arms 124 are thereby released and the control arm 66 is then moved to bring bevel gear 64 into position for engagement with gear 82. Arm 70 engages and moves plate 86 to unlock gear 82 and, with motor 56 operating in a direction opposite to its direction for lowering the traction means, the rod 80 will be rotated so that each windlass 92 will wind up the cables 94 attached thereto. Since each cable is also attached to a respective pivot arm 124 the winding up of the cables 94 will result in a pivoting force being applied to the pivot arms 124 which in turn lift the traction means to the retracted positions shown in FIG. 1. The hitch 14 is moved from its stowed position, in which it was placed for off-road use, and it can then be attached to the vehicle so that the traction device may be towed as a trailer.

Since it is desirable to keep the platform 18 generally horizontal during the transformation from tailer to off-road configuration and vice versa a stand may be utilized to support the forward end of the chassis during the transformation process.

It is understood that the foregoing provides a description of the preferred embodiment of the present invention and that alterations in the structure may occur to a skilled practitioner without departing from the spirit of the invention. For example, if the device were to be utilized with a four-wheel drive vehicle additional drive means could be provided for the extra driving wheels of the vehicle. Also, the orientation of the vehicle on the platform could be reversed so that the drive means are positioned towards the forward end of the platform 18 if the vehicle to be used were of the front-wheel drive variety rather than of the rear-wheel drive variety. The scope of protection to be afforded the present invention is thus to be determined from the claims appended hereto.

The embodiments of the invention in which an exclusive property or privilege is claimed are defined as follows:

1. A convertible traction device for use with a vehicle having at least two drive wheels, comprising:
   a trailer for towing behind said vehicle and having a platform sized to receive the vehicle, hitch means and a road wheel assembly;
   first means for selectively moving said road wheels between an operative ground engaging position and a retracted position, relative to said platform;
   traction means for each side of said trailer and including a traction belt and belt supporting means;
   second means for selectively pivotally moving the traction means between a retracted position above said platform and an operative ground engaging position outboard of the adjacent road wheel;
   means for locking said traction means and said road wheels in their respective operative and retracted positions; and
   drive means in said platform, engageable by the vehicle drive wheels, for driving said traction means when the vehicle is on the platform and the traction means are in their operative position.

2. The traction device of claim 1, wherein said road wheel assembly includes a pivotable suspension member connected to said platform and carrying road wheels rotatably thereon, and said first means comprises a threaded shaft bearingly mounted on said platform longitudinally thereof, a nut member threaded on said shaft and a link member interconnecting said nut member and said suspension member, rotation of said shaft imparting longitudinal movement to said nut member and, in turn, pivotal movement to said suspension member via said link member.

3. The traction device of claim 2, including a motor on said platform, and a gear selector including first and second selectable gear means therein, a selector shaft driven by said motor and a selector gear slidably mounted on said selector shaft for selected engagement with said first or said second gear means said first gear means being connected to said threaded shaft.

4. The traction device of claim 3 including a winch mounted on said platform adjacent said gear selector and manually selectable clutch means for engaging said selector shaft with said winch for driving said winch.

5. The traction device of claim 3 wherein said gear selector includes a housing mounted on said platform and containing said first and second gear means, said selector shaft and said selector gear, each of said first and second gear means being a single-faced bevel gear and having locking teeth on the back surface thereof, and said selector gear being a double-faced bevel gear.

6. The traction device of claim 5 wherein said belt supporting means includes a framework pivotally connected to said platform via a plurality of parallel longitudinally spaced pivot arms, said framework also including means rotatably mounting a plurality of aligned longitudinally spaced belt supporting wheels and a plurality of bogie-wheel assemblies, said traction belt being tensioned over said belt supporting wheels and said bogie-wheel assemblies.

7. The traction device of claim 6 wherein said framework is provided with means for extending longitudinally one portion of said framework relative to the remainder thereof for adjusting the tension in said traction belt.

8. The traction device of claim 6 wherein said second means includes a hoist shaft bearingly mounted on said platform with one end thereof connected to said second gear means, a plurality of windlass means keyed to said shaft, there being one windlass means positioned between each pair of opposing pivot arms of the opposing belt supporting means, and cable means connecting each windlass means to the opposing pivot arms whereby rotation of said hoist shaft in one direction will move said traction means in one direction between said retracted and operative positions and opposite rotation of the hoist shaft will move the traction means in the other direction between said operative and retracted positions.

9. The traction device of claim 6 or 8 wherein the locking means includes (a) spring biased pawl means engageable with the teeth provided on the back surface of said first and second gear means to prevent rotation thereof, and disengageable upon engagement of said selector gear with the selected one of said gear means whereby only one of said first and second gear means is engageable at one time, by said selector gear; and (b) a pair of locking bars movable longitudinally on said platform, there being one locking bar for each traction means, each said locking bar having a portion engageable with each said pivot arm when said traction means is in the operative position to prevent unwanted movement thereof to the retracted position.

10. The traction device of claim 6 wherein said drive means includes, for each traction means a pair of drive rollers engageable by the vehicle drive wheel, an idler roller engageable by said drive rollers, a drive shaft mounting said idler roller at one end and a drive sprocket at the other end, said drive shaft being bearingly mounted in said framework, a driven sprocket on a shaft mounting one of said belt support wheels and a drive chain interconnecting said drive sprocket and said driven sprocket.

11. The traction device of claim 10 including a disc brake on each drive shaft, a brake housing surrounding a portion of the disc brake, brake pad within said housing and an electric brake actuator for actuating said brake pads into engagement with the disc brake.

12. The traction device of claim 11 including electric switch means operable to selectively actuate one or both of said disc brakes through the brake actuators.

* * * * *